United States Patent [19]

Siegfried

[11] Patent Number: 5,102,539

[45] Date of Patent: Apr. 7, 1992

[54] METHOD OF PRODUCING A MEMBRANE AND A MEMBRANE FOR MICROFILTRATION, ULTRAFILTRATION, PERVAPORATION OR REVERSE OSMOSIS OF SUSPENSIONS, EMULSIONS AND FOR GAS SEPARATION

[75] Inventor: Hans-Gunther Siegfried, Seelbach, Fed. Rep. of Germany

[73] Assignee: Altenburger Electronic GmbH, Fed. Rep. of Germany

[21] Appl. No.: 643,722

[22] Filed: Jan. 18, 1991

[30] Foreign Application Priority Data

Jan. 21, 1990 [DE] Fed. Rep. of Germany ....... 4001654
Jul. 17, 1990 [DE] Fed. Rep. of Germany ....... 4022738

[51] Int. Cl.$^5$ ............................................. B01D 69/00
[52] U.S. Cl. .............................. 210/193; 210/497.1; 210/500.25; 210/490
[58] Field of Search ............ 210/500.25, 350, 351, 210/352, 497.1, 321.83, 321.74, 490, 639, 193; 29/163.7, 163.8

[56] References Cited

U.S. PATENT DOCUMENTS 3,462,362  8/1969  Kollsman ..................... 210/639 X
4,199,454  4/1980  Sartore ....................... 210/497.1 X

FOREIGN PATENT DOCUMENTS 3522725  8/1987  Fed. Rep. of Germany.
3741952  6/1989  Fed. Rep. of Germany.
3817578  7/1989  Fed. Rep. of Germany.

Primary Examiner—Frank Spear
Attorney, Agent, or Firm—Silverman, Cass & Singer, Ltd.

[57] ABSTRACT

A method of microfiltration, ultrafiltration and pervaporation, which also can be utilized for reverse osmosis of suspensions and emulsions, and for gas separation including providing a tubular membrane wound of wire and having a plurality of windings, the distance between windings establishing filter pores, passing a desired material between the windings to filter the material to a desired pore size and exerting a desired axial pressure on the membrane windings to adjust the distance between windings and the pore size to a predetermined amount.

20 Claims, 2 Drawing Sheets

METHOD OF PRODUCING A MEMBRANE AND A MEMBRANE FOR MICROFILTRATION, ULTRAFILTRATION, PERVAPORATION OR REVERSE OSMOSIS OF SUSPENSIONS, EMULSIONS AND FOR GAS SEPARATION

BACKGROUND OF THE INVENTION

1. Field of the Invention

The invention relates to a method and device for microfiltration, ultrafiltration, pervaporation or reverse osmosis of suspensions, emulsions or for gas separation where the material to be filtered is passed through a tubular wire membrane where the established pores between adjacent membrane windings are adjustable.

2. Description of the Prior Art

Processes and filter devices for microfiltration of particles from suspensions or gases utilizing a tubular wire wound membrane are known. In these existing processes and devices the membrane windings are wound under pre-stress and the slit-like membrane pores between adjacent membrane windings provide the separation of the particles to be filtered out of the feed. Such procedures for microfiltration, however, typically do not permit the separation of particles for ultrafiltration, pervaporation or gas/gas separation.

German Patent No. DE-OS 38 17 578 discloses a process and a device for micro and ultrafiltration as well as for reverse osmosis In this process, a membrane preferably is utilized that is formed by a tubular body wound with wire under pre-stress. The membrane can be coated with a moderately elastic, stretchable material coat that reduces the pore size. This membrane is used in a filtration device. The filtration process can be performed in a flow-through procedure or in a cross current effect as well as in the Daaden procedure.

German Patent No. DE-PS 35 22 725 discloses a membrane that is spirally formed of wire with or without pre-stress that has a material coat. This material coat can be applied before or after the winding process and can consist of fine organic or inorganic particles. With their crystalline or grid-like structures and their gaps, these can exert increased filter effects appropriate for special applications. The particles can be graphite, graphite oxide, metal, metal oxide, ceramic or other particles which are applied to the wires or fibers either by themselves or with a carrier substance (suspension, e.g., of water, fat, oil) and subsequently anchored tightly to the membrane The filter effect of these particles is generated by their porosity. The disadvantage of such membranes is their expensive production. Furthermore, since the particles are anchored tightly to the membrane, there is a danger that the entrances of the pores are plugged by this material coat during filtration and that a back-flow cleaning is difficult to accomplish. Additionally, the particles used for the material coat are only effective due to the entrances formed by them, i.e., the resulting porosity, and not due to other effects, such as an affinity to certain substances.

The present invention is designed to clearly reduce the separating borders of these known filter membranes in a simple manner so that the size of the particles to be separated from a feed can reach up to the ultra range (mol. separating area) and pervaporation as well as gas/gas separation can be provided, if necessary, by the use of composite membranes or separating membranes.

This invention also provides the advantage that the size of the pores between adjacent windings of a tubular membrane of a filtering device can be decreased in a direct manner through a reduction of the winding distances and by insertion of a fine separating layer. This results in the ability to reach the ultrafiltration range and to perform pervaporation as well as gas/gas separation. Thus, the fine separating layer functions as filter, phase and gas separating element, while the tubular membrane essentially serves as a support with microfiltration characteristics for the continued fine separating layer. Therefore, the diameter of the wire for the membrane windings can be large. The application of high filtration pressures and the achievement of high filter efficiency become possible. The fine separating layers are made of substances that exist in the feed or that are added to it during filtration. Because of the cross current effect, these substances are guided to the pores for forming the fine separating layer. The fine separating layer is maintained in the form of loose substances by the cross current effect, possibly with a continual exchange of substances. The fine separating layer can be porous or transport active depending on the substances used.

SUMMARY OF THE INVENTION

This invention provides a method of microfiltration, ultrafiltration and pervaporation, which also can be utilized for reverse osmosis of suspensions and emulsions, and for gas separation. A tubular membrane is provided which is wound of wire and includes a plurality of windings, the distance between windings establishing filter pores. A desired material is passed between the windings to filter the material to a desired pore size and a desired axial pressure is exerted on the membrane windings to adjust the distance between windings and the pore size to a predetermined amount.

A fine separating layer can be applied to the membrane windings either before or after filtration. This layer enables the membrane to reach the ultrafiltration range and to perform pervaporation as well as gas/gas separation.

DESCRIPTION OF THE PREFERRED EMBODIMENTS

Figure 1:
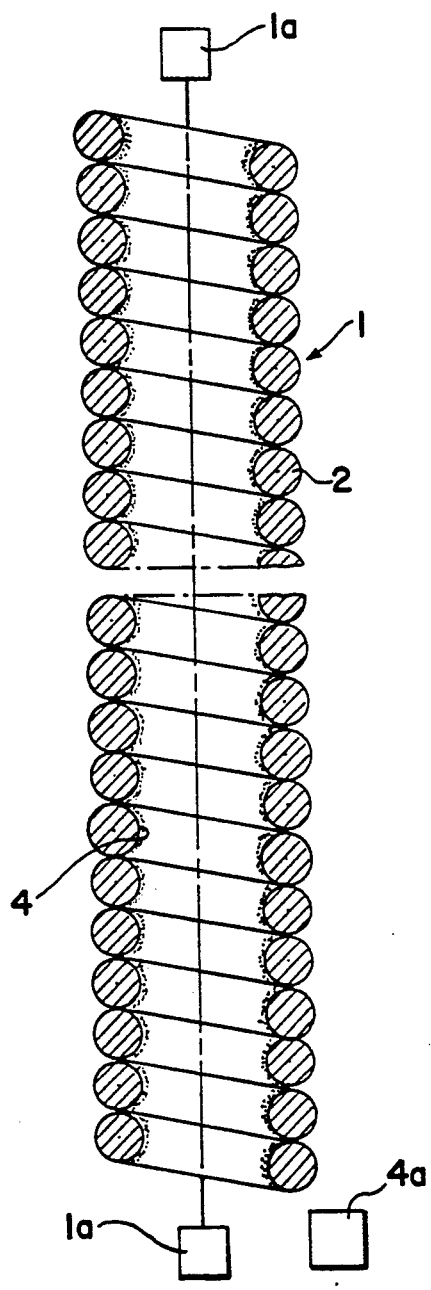
FIG. 1 is a vertical cross-sectional view of a tubular membrane of the invention utilized in a common filter device (not illustrated)
Figure 2:
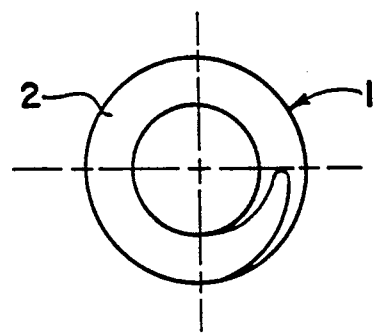
FIG. 2 is a top view of the membrane of FIG. 1.

Referring to FIG. 1, a common filter device (not illustrated) typically includes one or more tubular membranes 1. The membrane 1 is constructed from a wire which is wound spirally, preferably with high pre-stress. The wire can be made of metal, plastic, glass or any other suitable material The cross-sectional configuration of the wire can be circular, oval, rectangular or any other desired shape.

Preferably, the diameter of the wire is sufficiently large so that the tubular membrane can withstand a filtration pressure in the medium to high pressure range from approximately 1 to >1,000 bar, but can be greater or less if desired.

Slit like pores 3 are formed between adjacent windings 2 of the membrane 1. Typically, the pores 3 cannot be reduced to less than 0.5 μm due to unevenness of the wire during its manufacture. In the present invention, this unevenness can be reduced by providing high axial pressure on the membrane 1 with a pull device 1a. This permits reduction of the pore size to at least 1 nm.

The membrane 1, wound with or without pre-stress, can be utilized in the filtration of a liquid or gaseous feed with an assigned porous or transport active separating layer 4.

To form the porous layer 4, inorganic particles, such as glass powder up to the granular range 0.1 μm, ceramic particles, metal powder or other materials in powder form can be fed into the material feed by an insertion member 4a in such small amounts that only a layer with one or two granular layers can be formed because of the cross-current effect in the filter effective range of the pores 3 during filtration. The inorganic components can be sorted prior to feeding by sifting in metal wound membranes (not illustrated) with a defined pore size.

Figure 3:
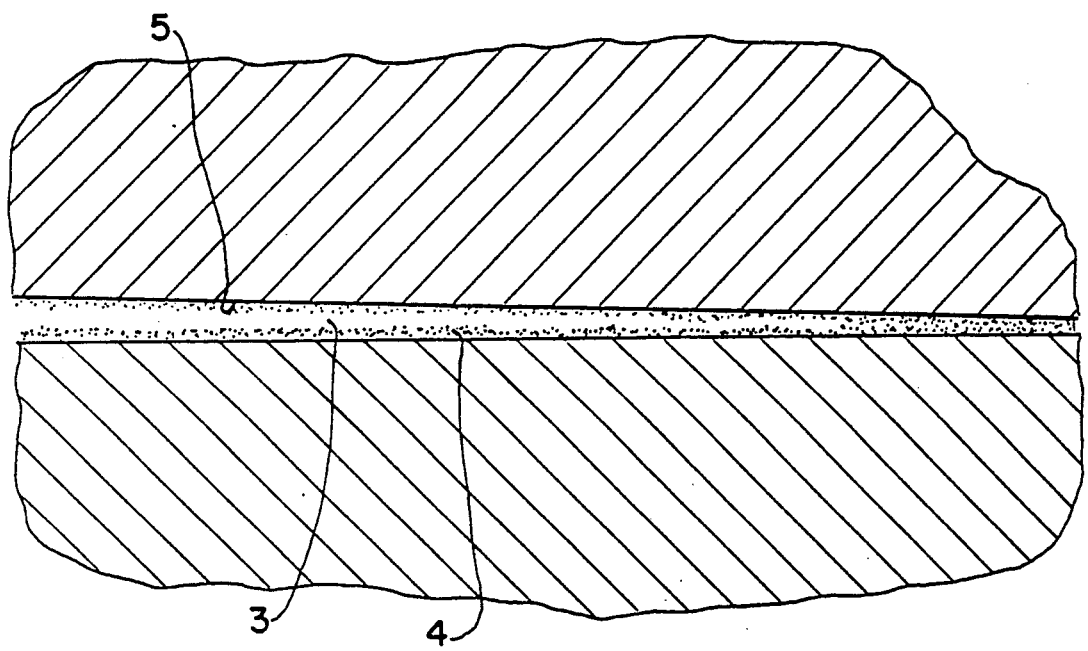
FIG. 3 is an enlarged cross-sectional view in partial section of the membrane of FIG. 1 illustrating a winding gap with a porous or homogeneous transport active separating layer loosely coating the membrane.

As FIG. 3 illustrates, with a correspondingly small distribution of the components in the feed, a deposit only occurs in the narrowest area of the distances of the windings 2. Without the separating layer 4, the pore slit 5 formed by the distance between the windings 2 allows permeation of larger, disk-like or staff-like particles. Thus, in the present invention, due to the separating layer 4 the disk-like or staff-like particles can no longer permeate. The original pore size formed by the pore slit 5 continues to decrease dependent on the size of the loose inserted particles.

It also is possible to form the separating layer 4 by substances extant in a suspension or in an aerosol. For this, the membrane 1 is used with pores of a size that a separating layer 4 forms in front of the pores 3 by deposits of the substances.

After forming the separating layer 4, the membrane 1 can be stretched, e.g., by a micrometer pull device, so that the separating layer 4 just bridges the enlarged pore 3. By stretching, a larger pore 3 is obtained so that a increase in efficiency becomes possible.

Since filter efficiency depends not only on the cross current, but also on pressure, the wire used for the windings 2 can be so thick that filter pressures of 1 bar to >1,000 or more are possible. High pressure applications of the above type increase the efficiency and the quality of the permeate significantly in cases where the porous fine separating layer 4 consists of non-compressible material (e.g., undissolved or separated metals already extant in the feed, absorbing materials, like active coal, kieselguhr or zeolite or catalyzers fed in granular form).

Figure 4:
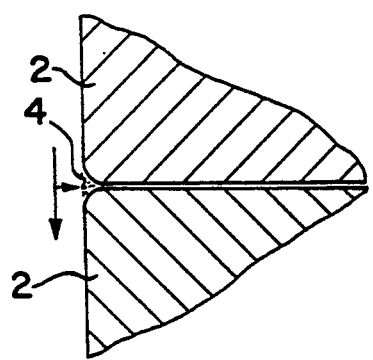
FIG. 4 is an enlarged cross-sectional view in partial section illustrating another embodiment of the invention.

Use of a multi-cornered, e.g. rectangular wire diameter as illustrated in FIG. 4, results in a small wedge at the rims or edges of adjacent windings 2 because of the small rim radius. This can only absorb few layers of free components that renew themselves continually through the effects of the longitudinal current and the cross-current in the feed. These components form a separating layer 5 the pores of which cannot be plugged.

Modifications and variations of the present invention are possible in light of the above teachings. A specific dimension, material or construction is not required so long as the device functions as herein described. It therefore is to be understood that within the scope of the appended claims, the invention may be practiced otherwise than as specifically described.

What is claimed and desired to be secured by letters patent of the United States is:

1. A method of producing a microporous membrane for microfiltration, ultrafiltration and pervaporation, which also can be utilized for reverse osmosis of suspensions and emulsions, and for gas separation which comprises:
   providing a tubular membrane wound of wire and having a plurality of windings, the distance between windings establishing filter pores;
   exerting a desired high axial pressure on the membrane windings to compress the surfaces between windings and reduce unevenness on the surfaces;
   releasing said high axial pressure; and
   exerting an axial pull on the membrane windings to establish said pores between the windings at a filter effective distance of at least 1 nm.

2. The method as defined in claim 1 including subjecting said membrane windings to a pre-stressing during winding.

3. The method as defined in claim 1 including providing the wire with a substantially circular cross-sectional configuration and a wire diameter which is selected so that the feed is movable through the membrane with a feed pressure of 1 to >1,000 bar.

4. The method as defined in claim 1 including inserting a predetermined substance onto said membrane pores between the windings to form a fine separating layer.

5. The method as defined in claim 4 including providing said fine separating layer by forming and maintaining said predetermined substance in the feed prior to filtration.

6. The method as defined in claim 4 including providing said fine separating layer by adding said predetermined substance to the feed during filtration.

7. The method as defined in claim 4 including guiding, depositing and fixing said fine separating layer to said membrane in the form of at least one of a suspension, a transparent polymer film, connected microparticles of a uniform size and a composite membrane having an active separating layer.

8. The method as defined in claim 5 including providing said fine separating layer with an absorbing material at least including active coal.

9. The method as defined in claim 5 including providing said fine separating layer with a material having a sieve effect, said material at least including kieselguhr.

10. The method as defined in claim 5 including providing said fine separating layer with a material having a defined pore size, said material at least including ceolythe.

11. The method as defined in claim 5 including providing said fine separating layer with a material having at least one of catalytic and enzymatic functions.

12. The method as defined in claim 11 wherein said material is at least one of platinum, palladium and similar deposited materials.

13. The method as defined in claim 1 including providing said wire with a substantially rectangular cross-sectional configuration.

14. A filter membrane device for microfiltration, ultrafiltration and pervaporation which also can be utilized for reverse osmosis of suspensions and emulsions, and for gas separation comprising:

a tubular membrane member wound of wire and having a plurality of windings, the distance between windings defining filter pores, said windings having engagement surfaces between consecutive windings, said surfaces being sufficiently even to provide an effective distance between said surfaces of at least 1 nm.

15. The device as defined in claim 14 wherein said windings are wound under pre-stressing.

16. The device as defined in claim 14 wherein said wire has a substantially circular cross-sectional configuration and the diameter of said wire is selected so that the feed is movable through the membrane with a feed pressure of 1 to >1,000 bar.

17. The device as defined in claim 14 including means for inserting a predetermined substance into said membrane pores between the windings to form a fine separating layer.

18. The device as defined in claim 17 wherein said means for inserting forms and maintains said predetermined substance in the feed prior to filtration.

19. The device as defined in claim 17 wherein said means for inserting adds said predetermined substance to the feed during filtration.

20. The device as defined in claim 14 wherein said wire has a substantially rectangular cross-sectional configuration.

* * * * *